Patented Feb. 3, 1931

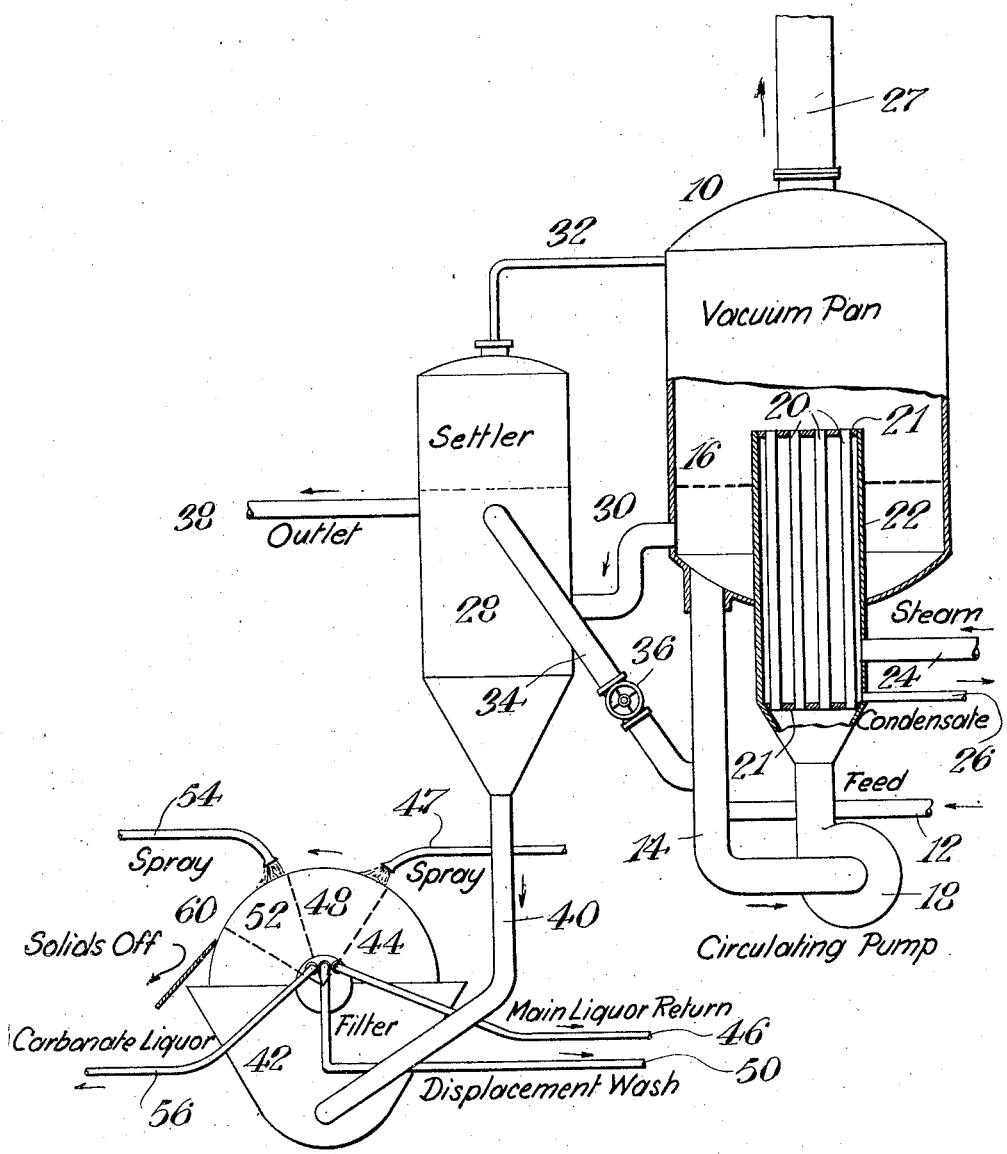

1,791,281

UNITED STATES PATENT OFFICE

HARRY WHEELER MORSE, OF REDWOOD CITY, CALIFORNIA

PRODUCTION OF SODIUM-CARBONATE LIQUOR

Application filed April 29, 1929. Serial No. 359,109.

This invention relates to the recovery of sodium carbonate from waste salts containing this salt, and in particular to its recovery from the tails salts produced in the treatment of Searles Lake brine.

It is an object of this invention to provide a process by which the sodium carbonate may be economically and easily separated from waste salts containing the same.

A further object is to provide a process for recovering sodium carbonate from Searles Lake brine tails salts, without affecting the recovery of the valuable potassium salts and borax contained in the brine.

Other objects will appear as the description proceeds.

During the evaporation of Searles Lake brine in multiple effect evaporators, crystalline solids (generally called "tails salts") separate which contain principally the chloride, sulfate and carbonate of sodium together with small amounts of other substances. If the brine is evaporated without pretreatment of any kind, the average tails salts which separate during evaporation may have the following approximate and typical composition:

|   | Per cent |
|---|---|
| Sodium carbonate | 12.5 |
| Sodium sulfate | 21.0 |
| Sodium chloride | 65.0 |

Of the total sodium carbonate present in these solids, 7½–8% of the weight of the tails salts is in combination with sodium sulfate as a double salt; the remaining 4½–5% being present in the free state.

In my co-pending application, Serial No. 351,331, filed March 30, 1929, I disclose a process for treating Searles Lake brine. This process comprises the addition to raw brine of solid tails salts from a previous portion of brine. After adding these salts to raw brine, and agitating at 90–100° C. for a time, without evaporation, nearly pure sulfate-carbonate of soda separates in solid form.

If now, brine which has been thus pretreated, is evaporated in a multiple effect evaporator, tails salts will of course separate in each pan. The average composition of the tails salts produced in any one pan will be different from that produced in the other pans, the high temperature pan yielding a product of the following typical composition:

|   | Per cent |
|---|---|
| Sodium carbonate | 16.0 |
| Sodium sulfate | 14.0 |
| Sodium chloride | 68.0 |

Of the sodium carbonate present in this mixture, 6 to 6½% of the weight of the tails salts is present as the double sulfate-carbonate, while 9½–10% is present as free sodium carbonate.

If tails salts produced in either of the foregoing ways are washed with water at a temperature of 30° C. to 40° C. sodium carbonate is readily dissolved therefrom to produce a solution containing up to 12% of sodium carbonate, together with sodium chloride and sodium sulfate. Working with the tails salts first mentioned, i. e., those from untreated brine, I find that sodium carbonate equal in weight to about 6½% of the weight of the tails salts, may be dissolved; if salts from pretreated brine are so treated, sodium carbonate equal in weight to about 12% of the weight of the tails salts will be dissolved.

The solution of sodium carbonate thus prepared will contain from 8 to 12% of sodium carbonate, and is a valuable raw material for the manufacture either of pure sodium carbonate, or as a raw material for the manufacture of caustic soda. Inasmuch as these tails salts have always been regarded as waste by products, and have been customarily discarded as worthless, it is apparent that my invention furnishes a very cheap source of sodium carbonate liquor and extracts a useful product from a hitherto practically useless one.

The total quantity of tails salts produced is quite large compared with the quantity of potassium chloride and borax produced in the operation, and if efficient recovery of the potassium chloride and borax of the brine is to be attained, the tails salts must be rather carefully washed free of adhering concentrated liquor. This washing is best performed by the use of raw brine, and the wash liquor so produced is added to the main brine feed of the evaporating system, thus returning to the system the potassium chloride and the borax.

I have found that following the raw brine wash, it is possible to recover a large part of the sodium carbonate of the tails salts by merely giving them a spray wash with fresh water. In this manner, I have been able to recover about 50% of the sodium carbonate from the tails salts of untreated brine, and about 75% of the sodium carbonate from the tails salts of a pretreated brine.

One method of carrying out my invention is illustrated in the accompanying sheet of drawings, in which the single figure represents a side elevation, partly in section, of apparatus particularly adapted to carry out said process.

I have shown generally at 10 a vacuum pan which may be one unit of a multiple effect system. Brine, either pretreated or untreated, may be fed into the pan through intake pipe 12 which I have shown as feeding into the L-shape conduit 14. This latter conduit taps into the bottom of the chamber 16 of the vacuum pan, and feeds at its lower end into a rotary pump 18. Pump 18 is thus adapted to draw liquid material from conduit 14, and discharge it through tubes 20 back into the chamber 16. A jacket 22 surrounds tubes 20, forming, together with tube sheets 21, a casing enclosing the tubes 20 to which steam is admitted through a steam inlet 24 for heating the liquid as it is forced through tubes 20.

Condensate may be removed from the casing through pipe 26. The water vapor is removed from the vacuum pan through a pipe 27 which is connected to a suitable vacuum system not shown.

A settling tank, indicated conventionally at 28, is connected with evaporator 10 through conduit 30. This settling tank may also be operated under a vacuum; a pipe 32, tapping into both settler and evaporator provides means for equalizing the pressure between the two. A return conduit 34 having a valve 36 provides means for optionally returning the clear, supernatant liquid from the settling tank back into the evaporator. An outlet pipe 38 is also provided for drawing off the clear liquid from the settler.

The tails salts which separate in settler 28 are transferred in the form of a sludge through conduit 40 to the pan 42 of a conventional type of vacuum filter. The drum of this filter operates in the direction indicated by the arrow.

On the first section of the filter drum, indicated at 44, the residual brine is removed from the sludge of tails salts, and the salts are sucked as dry as practicable. The mother liquor filtrate is withdrawn through pipe 46, and is returned to the evaporating system.

As the solids on the filter are carried past the limit of section 44, a spray of raw brine is applied through pipe 47. As the salts pass through section 48, liquor is sucked off and removed through pipe 50. This brine wash displaces the liquor remaining in the solids and permits recovery of practically all of the potassium chloride and borax. The displacement wash liquor is also returned to the evaporating system.

As the salts reach section 52, a spray of pure water from pipe 54 is applied thereto at a temperature of 30–40° C. This serves to dissolve the sodium carbonate as explained above. The fresh water with sodium carbonate in solution, is withdrawn through pipe 56. The sodium carbonate thus recovered may, of course, be used as desired. For example, the solution could be used directly after concentration for the production of other sodium compounds, such as caustic soda. The residual salts are scraped off the filter drum at 60, and are discarded.

While I have described a particular arrangement of apparatus, which I have found well adapted to carrying out my process, it must be understood that I do not limit myself thereto. Many changes in the details of operation would appear as obvious to anyone skilled in the art, and these changes are to be considered as comprised in my invention. I wish to be limited only by the prior art and the scope of the appended claims.

I claim:

1. A process for recovering sodium carbonate from tails salts containing the same, comprising washing said tails salts with water at a temperature of from 30° to 40° C.

2. A process for the recovery of sodium carbonate from Searles Lake brine, comprising evaporating said brine to cause a precipitation of tails salts, separating said tails salts from said partially evaporated brine, washing said tails salts with raw brine to remove the evaporated brine therefrom, and subsequently treating said washed tails salts with water at a temperature of 30° to 40° C. to dissolve out sodium carbonate from said tails salts.

In testimony whereof, I have signed my name to this specification.

HARRY WHEELER MORSE.